United States Patent [19]
Jordan et al.

[11] Patent Number: 5,779,267
[45] Date of Patent: *Jul. 14, 1998

[54] AIRBAG INFLATOR WITH COMPONENTS PROTECTED FROM HIGH-TEMPERATURE, REACTIVE GENERATED GASES

[76] Inventors: Michael P. Jordan, 8140 S. Cedar Cir., South Weber, Utah 84405; Alan J. Ward, 2942 N. 1150 East, North Ogden, Utah 84414; Christopher Hock, 6846 Buena Vista, Uintah, Utah 84405; Linda M. Rink, 3711 E. 4350 North, Liberty, Utah 84310

[ * ] Notice: The term of this patent shall not extend beyond the expiration date of Pat. No. 5,613,705.

[21] Appl. No.: 716,931
[22] Filed: Oct. 15, 1996

Related U.S. Application Data

[63] Continuation of Ser. No. 411,002, Mar. 27, 1995, abandoned.

[51] Int. Cl.[6] ........................................ B60R 21/26
[52] U.S. Cl. .......................... 280/740; 280/741; 55/435; 55/524
[58] Field of Search .......................... 280/741, 740, 280/736, 742; 55/435, 524; 102/530, 531; 422/164, 165, 166, 167

[56] References Cited

U.S. PATENT DOCUMENTS

| | | | |
|---|---|---|---|
| 3,267,672 | 8/1966 | Craig et al. | 60/39.47 |
| 3,741,585 | 6/1973 | Hendrickson et al. | 280/150 |
| 3,877,882 | 4/1975 | Lette et al. | 280/150 |
| 3,972,545 | 8/1976 | Kirchoff et al. | 280/735 |
| 3,985,076 | 10/1976 | Schneiter et al. | 280/729 |
| 4,030,525 | 6/1977 | Bassler et al. | 428/586 |
| 4,066,415 | 1/1978 | Kasama et al. | 280/741 |
| 4,068,862 | 1/1978 | Ishi et al. | 280/740 |
| 4,104,360 | 8/1978 | Meguerian et al. | 423/213.2 |
| 4,131,299 | 12/1978 | Ono et al. | 280/736 |
| 4,178,017 | 12/1979 | Ishi et al. | 280/740 |
| 4,339,320 | 7/1982 | Friese et al. | 204/408 |
| 4,369,079 | 1/1983 | Shaw | 280/728 |
| 4,547,342 | 10/1985 | Adams et al. | 280/741 |
| 4,561,903 | 12/1985 | Blaul | 134/10 |
| 4,902,036 | 2/1990 | Zander et al. | 280/743 |
| 4,931,112 | 6/1990 | Wardle et al. | 280/741 |
| 5,024,160 | 6/1991 | Canterberry et al. | 280/741 |
| 5,087,070 | 2/1992 | O'Loughlin et al. | 280/740 |
| 5,104,466 | 4/1992 | Allard et al. | 280/741 |
| 5,109,772 | 5/1992 | Cunnigham et al. | 280/741 |
| 5,116,080 | 5/1992 | Wipasuramonton | 280/741 |
| 5,136,952 | 8/1992 | Bennett, Jr. | 102/530 |
| 5,139,280 | 8/1992 | Cord et al. | 280/741 |
| 5,204,068 | 4/1993 | O'Loughlin et al. | 280/741 |
| 5,217,697 | 6/1993 | Kanazawa et al. | 280/735 |
| 5,306,041 | 4/1994 | Ogawa et al. | 280/741 |
| 5,417,932 | 5/1995 | Castagnos, Jr. et al. | 55/435 |
| 5,547,638 | 8/1996 | Rink et al. | 280/736 |
| 5,613,705 | 3/1997 | Hock et al. | 280/741 |

FOREIGN PATENT DOCUMENTS

| | | |
|---|---|---|
| 0640515 | 3/1995 | European Pat. Off. . |
| 94/27842 | 12/1994 | WIPO . |

*Primary Examiner*—Peter C. English

[57] ABSTRACT

Components of a vehicle airbag gas generator, or inflator, are coated with reactivity resistant materials to protect them from deterioration caused by contact with the high temperature, reactive gases generated by recently developed non-azide high reactive temperature gas generating materials. Suitable coatings include those produced from ceramics and reactivity resistant metals. These coatings also provide long term protection of the components from deterioration caused by the environment/atmosphere within the inflator.

26 Claims, 1 Drawing Sheet

AIRBAG INFLATOR WITH COMPONENTS PROTECTED FROM HIGH-TEMPERATURE, REACTIVE GENERATED GASES

This is a continuation of application Ser. No. 08/411,002, filed Mar. 27,1995, and now abandoned.

FIELD OF THE INVENTION

This invention relates to gas generators, or inflators, for use in vehicle airbag passive restraint systems. More particularly, the invention relates to platings or coatings provided on portions of certain of the inflator's components to prevent damage thereto either by the high temperature, chemically-reactive gases generated by the inflator's high reaction temperature gas generant compositions or by long term exposure to the atmosphere.

BACKGROUND OF THE INVENTION

Many of the airbag passive restraint systems used in modern vehicles rely on inflators which produce the gas needed to inflate the airbag by ignition of gas generant compositions. These compositions, once heated to their ignition temperature, combust to produce a large amount of gas in a relatively short period of time, thereby providing for the required rapid inflation of the airbag. It is also important that the generants provide the long term reliability required of airbag systems, which are expected to perform properly over the lifetime of the vehicle in which they are installed.

Recently, the most commonly used gas generant compositions have involved azide compounds, such as sodium azide, as the fuel component. As more fully explained in U.S. Pat. No. 3,741,585, these compositions provide long term reliability, relatively low reaction temperatures during the gas generation step, and non-toxic gas products. These compositions, however, are themselves toxic and are easily hydrolyzed. As explained in U.S. Pat. No. 4,369,079, they also readily react with heavy metals, such as copper, lead, etc., to form sensitive materials which are subject to unexpected ignition and detonation. These problems have led to the development of further gas generant compositions, such as the tetrazole and nitrotriazalone based compositions described in U.S. Pat. Nos. 4,369,079 and 4,931,112. The newer compositions, while described as providing a low temperature burn, nevertheless burn at temperatures significantly above the 2000° to 1000° F. temperatures attributed to the azide based compositions in the previously noted U.S. Pat. No. 3,741,585. These newer compositions are part of a class of compositions which is often referred to in the art either as non-azide generants or as high reaction temperature generants. Hereinafter, we shall refer to this class of compounds as high reaction temperature gas generating materials or generants.

A variety of materials have been used as the structural material in inflator housings, including steel, stainless steel and aluminum. Recently, aluminum has been favored due to its relative weight advantage, its long term corrosion resistance and its relative ease of processing. A particularly advantageous inflator, and method of fabricating such incorporating inertial welding, is described in U.S. Pat. No. 4,547,342.

All of the patents mentioned above are owned by the assignee of this application and are hereby incorporated by reference herein.

Testing of developmental prototypes of inflators similar to those described in U.S. Pat. No. 4,547,342, wherein gas generating materials within the non-azide or high reaction temperature generant category are used, has resulted in occasional excessive degradation of certain of the components of the inflator assembly. It is an object of the present invention to provide protective coatings on such components to minimize or control such degradation of the components as is caused by the reactive nature of the generated reaction products and the effects of prolonged exposure to the atmosphere.

A related invention is described in U.S. patent application Ser. No. 08/410,626, filed on Mar. 24, 1995, and entitled "An Airbag Inflator Having a Housing Protected From High-Temperature, Reactive Generated Gases". That application is assigned to the assignee of this cases and is incorporated by reference herein.

BRIEF SUMMARY OF THE INVENTION

The present invention provides a protective coating on those components in the inflator housing which are particularly vulnerable to attack by the high temperature and chemical reactivity of the reaction products produced by high-temperature, non-azide gas generants. These protective coatings can be prepared from metals or ceramics.

DETAILED DESCRIPTION OF THE INVENTION

Metal azides were, at one time, the gas generant material of choice for use in inflators. Newer gas generant materials, known generally as non-azide generants or high reaction temperature generants, however, offer compatibility, toxicity and safety advantages over the azide generants. Testing of these high reaction temperature generants in inflator structures similar to those used with azide gas generants has resulted in degradation of various of the components typically used in such structures. The present invention provides a protective coating on these components to permit their use with the newer high reaction temperature generants.

The improved inflators according to the present invention provide protective coatings to protect components particularly in those locations where the high temperature and/or high degree of impingement of the generated reaction products result in deterioration of such components due to the severe ablative and chemically reactive conditions produced by the generated gas. In addition, the improved inflators according to the present invention provide coatings to protect components from the corrosive conditions inside the inflator caused by the unreacted gas generant. When the component is made from a metal which is prone to deterioration by long term exposure to the atmosphere inside the inflator, the protective coatings can also be provided for protection against such deterioration. We have found that the particularly severe conditions are generally found in locations where the generated reaction products are at higher temperatures, i.e. before they have been significantly cooled, and/or where they have their greatest degree of impingement on the components, either because of high flow velocity in such location or because the components function in that location to change the direction of flow of the reaction products. Test firings of the inflators and careful inspection of the resulting fired inflators will identify those components, and the locations thereon, where protective coatings should be applied.

The protective coatings are generally comprised of erosion-resistant and chemical-resistant materials, which are hereinafter referred to as reactivity resistant materials. Ceramics, such as boron nitride, calcium silicate, aluminum silicate, silica, zirconia or alumina, can be coated on the surface to be protected by the use of a volatile carrier or by painting. Metals, such as copper, nickel or zinc, can be provided as a coating by techniques such as electroplating, chemical plating, using a volatile carrier, dipping in the molten metal or painting.

Figure 1:
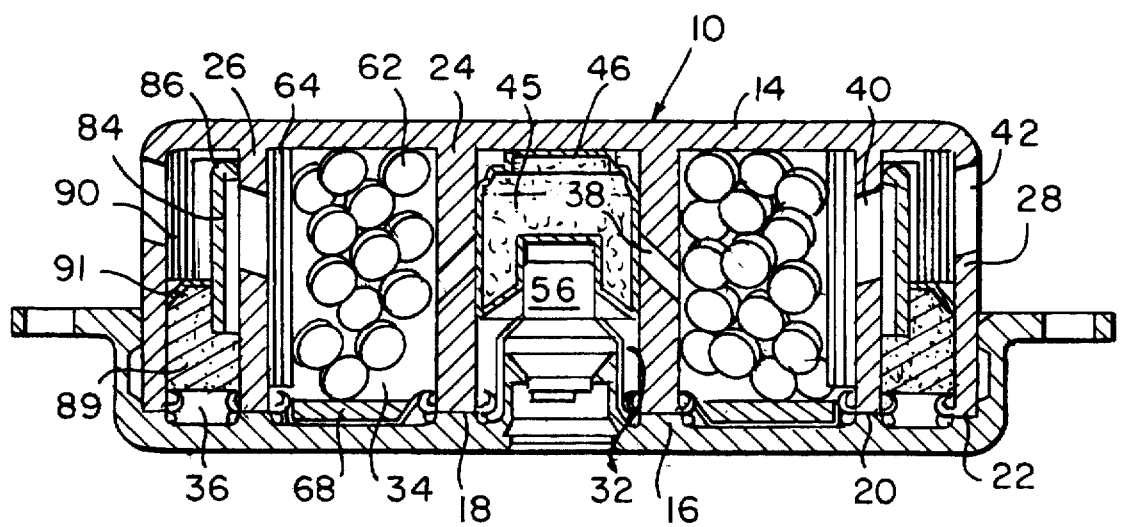
FIG. 1 is a sectional view of an inflator for use in a driver side airbag assembly in which protective layer coatings according to the present invention can be provided.

The gas generator, or inflator, depicted in FIG. 1 is an improved modification of the inflator illustrated in U.S. Pat. No. 4,547,342. The modified inflator assembly 10 is housed within upper shell or diffuser 14 and lower shell or base 16, which are joined at three simultaneously formed concentric welds 18, 20 and 22. The upper shell 14 and lower shell 16 comprise the inflator housing. The two cylindrical partitions 24 and 26 and cylindrical wall 28 as joined by the three welds define three concentric chambers, innermost igniter chamber 32, intermediate combustion chamber 34 and outermost chamber 36, which are interconnected through evenly spaced ports 38 and 40 in the respective cylindrical partitions 24 and 26. Outer cylindrical wall 28, forming the outer wall of the inflator housing, also contains evenly spaced ports 42 which guide the generated gas to the interior of an associated airbag (not shown). The igniter chamber 32 contains an initiator 56, which may be a conventional electric squib having electric terminals which are connected to an external crash sensing means (not shown). The initiator is in close proximity to an igniter charge assembly 45, comprising a rupturable aluminum container 46 containing an ignition material, such as a granular mixture of boron and potassium nitrate. The igniter chamber may also contain an auto-ignition device which initiates ignition when the inflator is subjected to elevated external temperatures as might occur in a vehicle or warehouse fire. The auto ignition device is designed to ignite at temperatures below those at which the aluminum housing loses its strength, thereby assuring that the aluminum housing does not disintegrate as a result of combustion of the gas generant. Intermediate combustion chamber 34 contains pellets 62 of a gas generant composition surrounded by a screen assembly 64. An amount of gas generator pellets sufficient to inflate the associated airbag is provided in the combustion chamber. Retainer disk 68 is provided to hold the pellets 62 and screen assembly 64 in place during the step of inertial welding which results in the welds 18, 20 and 22. Outermost chamber 36 contains a deflector ring 84 having an inwardly curved flange 86 at its upper end. At its lower end the deflector ring 84 engages a shaped porous metal structure 89, which can be formed by compressing a woven wire mat. A diffuser filter assembly 90 is provided in the upper part of chamber 36. The filter assembly 90 is separated from metal structure 89 by baffle washer 91 which directs the flow of generated gases from metal structure 89 through the filter assembly 90.

In the event of a collision, the crash sensing means (not shown) provides an electric impulse to squib 56 causing it to fire into and pierce the aluminum container 46 causing the igniter material to ignite, further rupturing the aluminum container 46. The resulting hot ignition reaction products flow through ports 38 into the intermediate combustion chamber 34 and into contact with the gas generant pellets 62 causing them to release a large quantity of inflation reaction products, principally consisting of sufficient generated gases to inflate an associated airbag. The inflation reaction products flow outwardly successively through the pellets 62, through the screen assembly 64 and through the ports 40. A thin layer of aluminum may be provided between screen assembly 64 and partition 26 so as to hermetically seal the combustion chamber 34 and igniter chamber 32 from the atmosphere. The aluminum layer is sufficiently thin that the portion thereof covering ports 40 bursts from the pressure developed by the generated reaction products. After passing through ports 40, the reaction products impinge on the deflector ring 84 and are directed to and through porous metal structure 89. The reaction products exit metal structure 89 directly outside of deflector ring 84 and are directed through filter assembly 90 and port 42 to be discharged to, or directed to, the inside of an associated airbag (not shown), thereby inflating same.

While the inflator as described above has worked well with metal azide gas generants, the previously noted problems of ablation, chemical reaction, etc., have occurred in developmental testing of such inflators using the newer non-azide or high reaction temperature gas generants. According to this invention, components, particularly the deflector ring 84 and those components, or structures, made of woven or knitted steel wire or porous sintered steel filter mats, such as are used to form the screen assembly 64, the shaped porous metal structure 89 and the filter assembly 90, are provided with a protective coating of a suitable reactivity resistant material in order that these components can be effectively used with the newer high reaction temperature non-azide gas generants. The previously mentioned ceramics and metals, such as, boron nitride, calcium silicate, aluminum silicate, silica, zirconia, alumina, nickel, zinc or copper, are reactivity resistant materials suitable for forming such coatings. The woven or knitted wire structures and the porous sintered steel mat structures are provided in the inflator to filter any non-gaseous particles from the generated gas and to cool the generated gas. Typically, in gas generators using azide gas generant materials, these porous metal structures have been formed from steel. The newer high reaction temperature, non-azide gas generant materials, however, produce gas products which appear to react with steel and cause deterioration of such porous structures. The closer a given structure is located to the gas generant pellets, the higher is the temperature produced at the structure, resulting in a higher degree of deterioration. Also, the greater the degree of impingement of the generated gases at a given location on the structure, the greater is the deterioration at such location. A coating of a reactivity resistant material on the steel wire used in woven or knitted wire structures provides resistance against such deterioration. While the coating can be applied to the woven or knitted metal wire structure, it is preferred that the coating be applied to the wire prior to fabricating the wire into such woven or knitted structure. A coating of copper having a thickness in the range of 0.0005 to 0.01 inches provides effective protection of a woven steel wire screen when such is used with a gas generant material comprising 5-aminotetrazole, cupric oxide, guanidine nitrate, sodium nitrate mica and calcium stearate.

Figure 2:
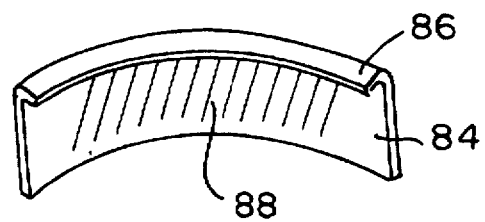
FIG. 2 is a perspective view of a section of a deflector ring on which a protective coating according to the present invention may be applied.

Deflector ring 84, as used in the embodiment of FIG. 1, serves to direct the generated reaction products downward or toward the porous metal structure 89 as they enter outermost chamber 36 from the combustion chamber 34. In accord with such function, the deflector ring is heavily impinged upon by the high temperature reaction products. As illustrated in FIG. 2, the deflector ring 84 is generally shaped as a hollow cylinder with an inwardly extending flange 86 at one end thereof. Prior art inflators using azide-type gas generants have typically formed such deflector rings of stainless steel or aluminum, sometimes having an anodized oxide coating. In accord with the present invention, it has been discovered that a steel deflector ring having a coating of a reactivity resistant material at least on its interior surface 88 is particularly effective and economical for use with the newer high reaction temperature, non-azide gas generating materials. Both stainless steel and carbon steel have been used to form such rings. The previously mentioned metals and ceramics can be employed as the reactivity resistant material of the protective coating. We presently prefer coatings of either copper or zinc. Copper coatings should have a thickness of up to 0.015 inches, preferably in the range of 0.0003 to 0.010 inches. Zinc coatings should be up to 0.020 inches thick, preferably in the range of 0.0003 to 0.015 inches thick, and most preferably, in the range of 0.0013 to 0.010 inches thick. These coatings are also useful in protecting the steel components, such as the deflector ring, from degradation due to long term exposure to the environment within the inflator during the lifetime of the vehicle in which the airbag system is installed.

The gas generants known as high reaction temperature, or non-azide, generants presently include tetrazole compounds, such as 5-amino tetrazole, tetrazole, bitetrazole and metal salts of these compounds; triazole compounds, such as 1,2,4-triazole-5-one, 3-nitro-1,2,4-triazole-5-one and metal salts thereof; alkali, alkaline earth and transition metal salts of dicyanamide, and mixtures thereof; nitrate salts of amines or substituted amines, such as guanadine nitrate, aminoguanidine nitrate, diaminoguanidine nitrate, triaminoguanidine nitrate, semicarbazide nitrate, ethylenediamine nitrate, hexamethylene tetramine dinitrate and mixtures of such compounds; and salts of 5-nitrobarbituric acid and 5-nitroorotic acid. The gas generant compositions also include an oxidant, such as a nitrogen oxide or a metal or metalloid oxide, such as cupric oxide. A presently preferred high reaction temperature gas generant composition comprises amino tetrazole combined with copper oxide, sodium nitrate, guanadine nitrate mica and calcium stearate.

A mullite (aluminum silicate) suspension was brushed on a deflector ring in various thicknesses and then cured at 200° F. for three hours to result in coatings ranging between 0.005 and 0.020 inches thick. For production purposes, other application methods, such as spraying or dipping, would be more suitable.

The protective layer concepts described herein are applicable generally to protect the components in inflator structures. Routine testing of prototype inflators can identify those components which need additional protection, while routine testing of the various protective layers described herein should serve to identify those materials which function best in a particular inflator environment. Accordingly, the invention should not be construed to be limited to the particular embodiments herein described, but should be limited only in accord with the terms of the following claims.

We claim:

1. In a gas generator for a vehicle airbag assembly comprising:

(a) a housing enclosing a combustion chamber, said housing having an outer wall containing at least one port from which generated gas can be discharged, (b) said combustion chamber containing a high reaction temperature gas generating material capable of producing sufficient generated gas to inflate an airbag, said gas generating material containing at least one material selected from the group consisting of triazole compounds, tetrazole compounds, salts of 5-nitrobarbituric acid, salts of 5-nitroorotic acid, salts of dicyanamide, nitrate salts of amines and nitrate salts of substituted amines, (c) a porous structure located in said housing so that the gas generated in the combustion chamber will impinge upon at least a portion of the surface of said porous structure as it flows through the porous structure prior to flowing through said at least one port in said outer wall of said housing;

the improvement comprising providing a coating of a protective material selected from the group consisting of metals and ceramics on said portion of the surface of said porous structure, said coating having a thickness sufficient to protect said porous structure from chemical and ablative deterioration caused by the impingement of said generated gas on said structure.

2. The gas generator of claim 1, wherein said porous structure comprises a porous metal structure.

3. The gas generator of claim 1 wherein said porous structure comprises a structure fabricated from woven or knitted metal wire.

4. The gas generator of claim 3 wherein said metal wire is steel and wherein said coating is copper.

5. The gas generator of claim 3 wherein said coating is applied to said metal wire prior to fabricating said wire into a woven or knitted structure.

6. In a gas generator for a vehicle airbag system, comprising:

a housing enclosing a combustion chamber, said housing having an outer wall containing at least one port from which generated gas can be discharged, said combustion chamber containing a high reaction temperature gas generating material capable of producing sufficient generated gas to inflate an airbag, said gas generating material containing at least one material selected from the group consisting of triazole compounds, tetrazole compounds, salts of 5-nitrobarbituric acid, salts of 5-nitroorotic acid, salts of dicyanamide, nitrate salts of amines and nitrate salts of substituted amines, said housing also enclosing a structure located at a position in said housing where at least a portion of said structure will be impinged upon by the gas generated in the combustion chamber as said gas is directed to said at least one port;

the improvement comprising providing a protective coating of a material selected from the group consisting of metals and ceramics on said portion of said structure, said protective coating having a thickness sufficient to protect said structure from chemical and ablative deterioration caused by the impingement of said generated gas on said structure.

7. The gas generator of claim 6 wherein said structure is fabricated from metal.

8. The gas generator of claim 7 wherein said structure is fabricated from a stainless steel.

9. The gas generator of claim 7 wherein said structure is fabricated from a carbon steel.

10. The gas generator of claim 6 wherein said protective coating consists essentially of copper.

11. The gas generator of claim 6 wherein said protective coating consists essentially of zinc.

12. The gas generator of claim 6 wherein said protective coating comprises a ceramic material.

13. The gas generator of claim 12 wherein said ceramic material contains at least one material selected from the group consisting of boron nitride, aluminum silicate, calcium silicate, alumina, silica and zirconia.

14. The gas generator of claim 6 wherein said protective coating has a thickness in the range of 0.0013 to 0.020 inches.

15. In a gas generator for a vehicle airbag system, comprising:
(a) a housing enclosing a combustion chamber and a deflection structure, said housing having an outer wall containing at least one port from which generated gas can be discharged,
(b) said combustion chamber containing a high reaction temperature gas generating material capable of producing sufficient generated gas to inflate an airbag and containing at least one material selected from the group consisting of triazole compounds, tetrazole compounds, salts of 5-nitrobarbituric acid, salts of 5-nitroorotic acid, salts of dicyanamide, nitrate salts of amines and nitrate salts of substituted amines,
(c) said deflection structure being located at a position in said housing where at least a portion of said deflection structure will be impinged on by said generated gas causing the direction of flow of said generated gas to be diverted as said gas flows from its place of generation in said combustion chamber to said at least one port;
the improvement comprising providing a protective coating of a material selected from the group consisting of metals and ceramics on at least said portion of said deflection structure impinged on by said generated gas, said protective coating having a thickness sufficient to protect said portion of said deflection structure from chemical and ablative deterioration caused by the impingement of said generated gas on said structure.

16. The gas generator of claim 15 wherein said material of said protective coating comprises a material selected from the group consisting of boron nitride, aluminum silicate, calcium silicate, alumina, silica, zirconia, zinc, copper, and nickel.

17. The gas generator of claim 15 wherein said portion of said defection structure is shaped as a hollow cylinder and said protective coating covers at least a part of the inner surface of said hollow cylinder.

18. The gas generator of claim 17 wherein said deflection structure includes an inwardly extending flange at one end of said hollow cylinder.

19. The gas generator of claim 15 wherein said protective coating has a thickness in the range of 0.0013 to 0.020 inches.

20. The gas generator of claim 15 wherein said protective coating comprises a ceramic material.

21. The gas generator of claim 15 wherein said deflection structure is formed from steel and said protective coating comprises a ceramic material.

22. A deflection ring for use in the gas generator of a vehicle airbag system, at least a portion of said ring shaped as a hollow cylinder having an interior surface and an exterior surface, said hollow cylinder being fabricated of steel and having a protective coating on at least a part of its surface, said protective coating comprising a ceramic material having a thickness which is sufficient to protect the underlying steel portion of said cylinder from chemical and ablative deterioration when subjected to the impingement of gases generated from high reaction temperature gas generating materials during the activation of said gas generator.

23. The deflection ring of claim 22 further comprising an inwardly extending flange at one end of said portion shaped as a hollow cylinder.

24. The deflection ring of claim 22 wherein said protective coating has a thickness in the range of 0.0013 to 0.020 inches.

25. The deflection ring of claim 22 wherein the ceramic material of said protective coating comprises a material selected from the group consisting of boron nitride, aluminum silicate, calcium silicate, alumina, silica and zirconia.

26. The deflection ring of claim 22 wherein said protective coating is provided on at least a part of the interior surface of said hollow cylinder.

* * * * *